March 25, 1930.   M. LACHNER   1,751,928
SAND SPREADER FOR TRUCKS
Filed March 7, 1927
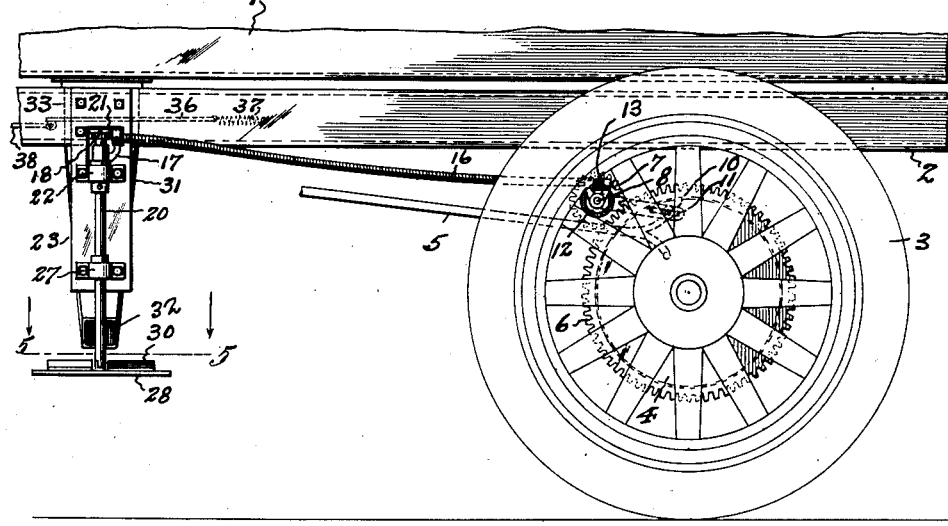
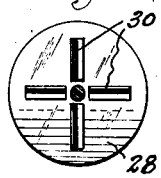
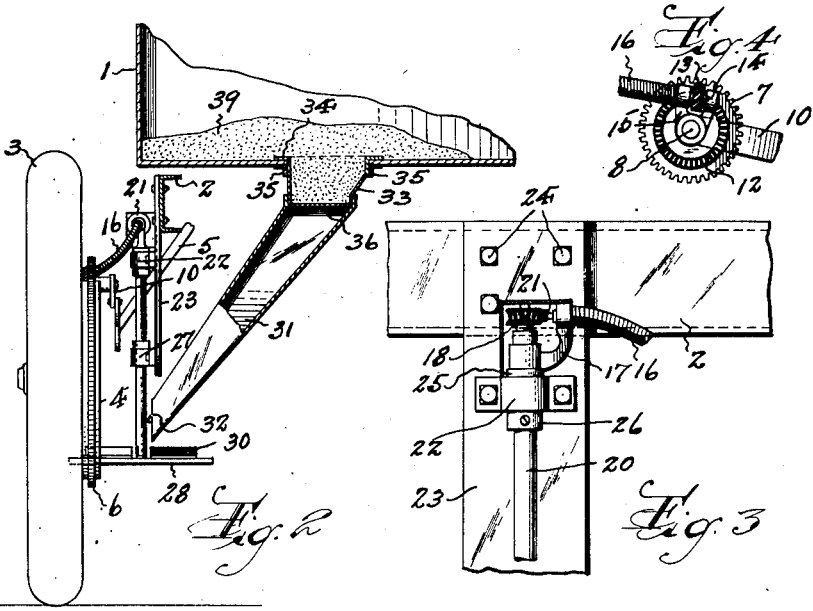
INVENTOR
Martin Lachner
BY
George D. Richards
ATTORNEY Patented Mar. 25, 1930

1,751,928

UNITED STATES PATENT OFFICE

MARTIN LACHNER, OF DELAWANA, NEW JERSEY

SAND SPREADER FOR TRUCKS

Application filed March 7, 1927. Serial No. 173,404.

This invention relates to spreaders and particularly to spreaders for spreading road building or surfacing materials.

One feature of the invention is to provide a spreader of the above character that may be applied to any type of motor truck and arranged, upon movement of the truck, to spread the material carried thereby.

Another feature of the invention resides in the provision of a spreader of the above character that is capable of spreading material to various distances and in varying quantities as desired.

Still another feature of the invention is to provide a spreader of the above character that is of simple construction and readily installed and which is easily operated.

Other features and advantages will become apparent from the specification, taken in connection with the accompanying drawings wherein one embodiment of the invention is illustrated.

In the drawings:—

Figure 1 is a view, in side elevation and with parts broken away, of a truck equipped with the spreader of this invention;

Figure 2 is a view, with parts broken away, taken from the rear of the truck illustrated in Figure 1;

Figure 3 is an enlarged detail view of a portion of the structure illustrated in Figure 1;

Figure 4 is an enlarged detail view of a portion of the structure illustrated in Figure 1; and Figure 5 is sectional view taken along the line 5—5 of Figure 1.

Referring to Figures 1 and 2 a truck 1 has a chassis frame 2 and a rear wheel 3. The brake drum for the rear wheel is designated 4 while 5 is a rear radius rod attached to the axle housing.

According to the preferred arrangement a ring gear 6 is mounted on the rear wheel, as on the brake drum 4. Ring gear 6 is arranged to drive a pinion 7. Pinion 7 is rotatably mounted on a shaft 8 that is carried by a bracket 10. Bracket 10 is provided with a longitudinally extending slot 11. A bolt for radius rod 5 extends through the slot 11 in bracket 10 and secures this bracket to the rear axle housing. The slot 11 permits the adjustment of bracket 10 and pinion 7 with respect to the ring gear 6.

As is also illustrated in Figure 4, one side of the pinion 7 is provided with teeth 12 that mesh with a spiral gear 13. Spiral gear 13 is secured to a shaft 14. Shaft 14 is rotatably supported at opposite sides of the gear 13 in bearings provided in a bearing bracket 15. Bearing bracket 15 is carried by the shaft 8. Shaft 14 is operatively connected to a flexible shaft (not shown) that is positioned within a flexible shaft casing 16. One end of the flexible shaft casing 16 is attached to the bearing bracket 15 while the other end of this casing is attached to a bearing bracket 17. As is also illustrated in Figure 3, the bearing bracket 17 is mounted so as to be free to swivel upon the hub of a worm gear 18 that is secured to the upper end of a vertically extending spreader shaft 20. The flexible shaft, within the casing 16, extends from the spiral gear 13 through this casing and is operatively connected to a spiral gear 21 that is rotatably carried by the bearing bracket 17. Spiral gear 21 meshes with worm gear 18. The spreader shaft 20 extends through an antifriction bearing 22 that is secured by screws to a hanger 23. The upper portion of hanger 23 is attached to the chassis frame 2 at a point that is positioned preferably midway between the front and rear wheels of the truck. The hanger 23 is secured to the chassis frame 2 by bolts 24 extending through apertures provided in these members. Collars 25 and 26 are secured to the spreader shaft 20 and are positioned adjacent the antifriction bearing 22. These collars prevent the spreader shaft from moving longitudinally with respect to the bearing 22. From the bearing 22, the spreader shaft 20 extends downwardly and through an antifriction bearing 27 that is secured to the hanger 23 and is similar to the bearing 22.

A spreader disk 28 is secured at its center to the lower end of the spreader shaft 20. The spreader disk 28 is provided with radially extending blades 30, having the form of angle bars, that are secured to the upper surface of the spreader disk. A chute 31 is supported from the chassis 2 by means of a suitable bracket (not shown) and has its discharge end 32 positioned above the spreader disk 28. A discharge member 33 has a flange 34 that rests upon the bottom of the body of the truck 1. The flange 34 is secured by rivets to the bottom of the truck body and to angle bars 35 positioned under the truck adjacent the sides of the discharge member. The lower end of the discharge member 33 extends into the upper end of the chute 31. A discharge plate 36 is carried by the discharge member 33. Discharge plate 36 is arranged to slide horizontally with respect to the discharge member 33. Discharge plate 36 is adapted to regulate the rate at which material 39 carried by the truck is discharged from the truck body through the discharge member and into the chute 31. This plate is biased by a tension spring 37 so as to completely close off the flow of such material. Spring 37 is connected at one end to the truck body and at its other end to one end of the discharge plate 36. A link 38 is connected to the other end of the discharge plate and is arranged to be moved by the truck operator.

The operation of the spreader is as follows:

As the truck 1 moves along the ground the ring gear 6 turns with the rear wheel 3 and revolves the pinion 7. The motion of pinion 7 is transmitted by the flexible shaft within the casing 16 to the spiral gear 21 and causes this gear to revolve worm gear 18 and spreader shaft 20. Spreader disk 28 turns with spreader shaft 20. Should the truck operator desire to spread the material 39 that is within the truck, he moves the link 38 against the tension of spring 37 and causes the discharge plate 36 to move so as to permit the material 39 to pass from the discharge member 33 into the chute 31. The material 39 passing out of the discharge end 32 of the chute, falls upon the spreader disk 28. The blades 30 of the spreader disk cause material 39 to revolve with the spreader disk. As this material commences to revolve with the spreader disk the centrifugal force acting upon such material, due to its angular motion, causes it to be thrown from the spreader disk in directions that are tangent to the circumference of the disk. The extent to which the discharge plate is moved from its closed position will determine the rate at which the material is fed upon the ground. The rapidity with which the spreader disk revolves and therefore the distance to which the material is thrown before striking the surface of the ground depends upon the size of the pinion 7. Making this pinion smaller causes the spreader disk to revolve at a higher rate, resulting in the material being thrown to a greater distance. Various sizes of pinions may be mounted on the shaft 8 of the bracket 10, thereby securing the desired speed of the spreader disk. Secondarily, the speed of revolution of the spreader disk varies with the speed of movement of the truck.

By varying the length of the spreader shaft and therefore the elevation of the spreader disk above the ground, the distance to which the material is thrown is also varied.

Inasmuch as the spreader disk 28 carried by the hanger 23 is positioned below the chassis frame and substantially midway between the front and rear wheels of the truck, the material thrown from this disk is spread in all directions without interference from any part of the truck. This positioning of the spreader disk is desirable because it enables the spreader to operate at a maximum of efficiency and eliminates the necessity of deflectors or guards placed around the periphery of the disk for the purpose of preventing the wheels or other parts of the truck from interfering with the operation of the spreader.

The spreader may be used for spreading various materials such as sand, gravel, water and oil and several spreader disks having various forms of blades may be used to obtain the best results with the various materials used.

The spreader is readily applied to any type of car and may be operated directly from the propeller shaft instead of from the rear wheel if desired.

It is to be noted that in the event the truck body is swung upwardly with respect to its chassis, as when material is dumped from the rear of the truck, the lower end of the discharge member passes out of the upper end of the chute 31. When the truck body is again lowered, the lower end of the discharge member passes into the chute 31.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A spreader for trucks comprising, a hanger secured to the truck chassis well in advance of the rear wheels of the truck, a bearing carried by said hanger, a vertical spreader shaft mounted in said bearing for rotation about a vertical axis, a horizontal spreader disk secured to said spreader shaft, a chute secured to the truck chassis, said chute having its discharge end positioned over the spreader disk and its intake end positioned under the truck body, and a discharge member provided on the bottom of the truck body over the intake end of said chute, said discharge member having its lower outlet portion positioned to extend into the intake end of said chute during the spreading operation, said discharge member being arranged to move out of the intake end of said chute during a dumping operation of the truck.

2. A spreader for trucks comprising, a hanger secured to the truck chassis substantially in advance of the rear wheels of the truck, a bearing carried by said hanger, a rotatable spreader shaft mounted in said bearing, a spreader disk secured to said spreader shaft, a chute secured to the truck chassis and arranged to convey material to said spreader disk, a discharge member provided on the truck body over said chute, said discharge member having its lower outlet portion positioned for extending into said chute during the spreading operation for the purpose of conducting material from the truck body to the chute, and a valve associated with said discharge member for controlling the rate at which material is fed into said chute, said discharge member moving out of said chute during a dumping operation of the truck.

In testimony, that I claim the invention set forth above I have hereunto set my hand this 3rd day of March, 1927.

MARTIN LACHNER.